United States Patent
Helms et al.

(10) Patent No.: US 7,231,474 B1
(45) Date of Patent: Jun. 12, 2007

(54) SERIAL INTERFACE HAVING A READ TEMPERATURE COMMAND

(75) Inventors: Frank P. Helms, Tokyo (JP); Larry D. Hewitt, Austin, TX (US); Scott E. Swanstrom, West Linn, OR (US); Ross Voigt LaFetra, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 143 days.

(21) Appl. No.: 11/140,803

(22) Filed: May 31, 2005

Related U.S. Application Data (60) Provisional application No. 60/575,999, filed on Jun. 1, 2004.

(51) Int. Cl.
G06F 1/30 (2006.01)
G06F 1/20 (2006.01)
G06F 13/00 (2006.01)

(52) U.S. Cl. .................. 710/110; 713/300; 713/600; 702/132; 340/584

(58) Field of Classification Search ............... 710/100, 710/110, 305, 72; 712/32–33, 600, 300, 712/310, 320, 322; 700/291–293; 711/154; 702/130–132; 340/584
See application file for complete search history.

(56) References Cited

U.S. PATENT DOCUMENTS

| | | | |
|---|---|---|---|
| 4,689,740 A | 8/1987 | Moelands et al. | |
| 5,559,502 A | 9/1996 | Schutte | |
| 5,689,196 A | 11/1997 | Schutte | |
| 6,038,623 A | 3/2000 | Schutte | |
| 6,092,138 A | 7/2000 | Schutte | |
| 6,141,762 A * | 10/2000 | Nicol et al. | 713/300 |
| 6,167,492 A * | 12/2000 | Keller et al. | 711/154 |
| 6,172,611 B1 * | 1/2001 | Hussain et al. | 340/584 |
| 6,272,642 B2 * | 8/2001 | Pole et al. | 713/300 |
| 6,282,126 B1 * | 8/2001 | Prall | 365/185.3 |
| 6,282,662 B1 * | 8/2001 | Zeller et al. | 713/300 |
| 6,347,379 B1 * | 2/2002 | Dai et al. | 713/320 |
| 6,510,400 B1 * | 1/2003 | Moriyama | 702/132 |
| 6,523,126 B1 * | 2/2003 | Brabenac | 713/323 |
| 6,535,798 B1 * | 3/2003 | Bhatia et al. | 700/293 |
| 6,591,369 B1 * | 7/2003 | Edwards et al. | 713/400 |
| 6,714,891 B2 * | 3/2004 | Dendinger | 702/132 |
| 7,050,885 B2 * | 5/2006 | Fiegle et al. | 700/276 |
| 7,051,218 B1 * | 5/2006 | Gulick et al. | 713/310 |
| 2005/0244972 A1 * | 11/2005 | Hilson et al. | 436/47 |
| 2006/0146649 A1 * | 7/2006 | Pappas et al. | 368/10 |

OTHER PUBLICATIONS

"A smart RTD temperature sensor with a prototype IEEE 1451.2 internet interface" by Wobschall et al. (abstract only) Publication Date: 2004.*

(Continued)

*Primary Examiner*—Gopal C. Ray
(74) *Attorney, Agent, or Firm*—Zagorin O'Brien Graham LLP (57) ABSTRACT

A serial communication system includes an integrated circuit having a master serial interface; and a processor having a slave serial interface coupled to the master serial interface through a clock signal line and a data signal line. The slave serial interface is responsive to a read temperature command issued by the master serial interface to return a first temperature value associated with the processor.

20 Claims, 5 Drawing Sheets

OTHER PUBLICATIONS

Kalinsky, David and Kalinsky, Roee, "Introduction to Serial Peripheral Interface," Embedded Systems Programming, Feb. 1, 2002, 3 pages, retrieved Apr. 25, 2005 from URL: <http://www.embedded.com/shared/printableArticle.jhtml?articleID=9900483>.

Kalinsky, David and Kalinsky, Roee, "Introduction to 12C," Embedded Systems Programming, Jul. 31, 2001, 4 pages, retrieved Apr. 24, 2005 from URL: <http://www.embedded.com/shared/printableArticle.jhtml?articleID=9900244>.

* cited by examiner

SERIAL INTERFACE HAVING A READ TEMPERATURE COMMAND

CROSS-REFERENCE TO RELATED APPLICATION(S)

This application claims benefit under 35 U.S.C. § 119(e) of application No. 60/575,999 filed Jun. 1, 2004, entitled Method and Apparatus for Serial Interface, which application is incorporated herein by reference.

BACKGROUND

1. Field of the Invention

This invention relates to a serial interface for use on integrated circuits, particularly a serial interface for a microprocessor.

2. Description of the Related Art

Microprocessors have traditionally utilized an on-die thermal diode to provide temperature information to an off-chip monitoring device. In traditional implementations, two pins on the microprocessor are utilized to interface the diode to the monitoring device, which determines the temperature of the microprocessor based on the diode. The temperature information is utilized for thermal control, e.g., fan control or other thermal management activities.

SUMMARY

Some microprocessors have developed the capability of generating a digital temperature value rather than supplying temperature information via a thermal diode interface. In order to provide access to that temperature and other processor information, it would be desirable to provide a simple interface that allows that digital temperature value to be read.

Accordingly, in an embodiment a serial communication system is provided that includes an integrated circuit having a master serial interface; and a processor having a slave serial interface coupled to the master serial interface through a clock signal line and a data signal line. The slave serial interface is responsive to a read temperature command issued by the master serial interface to return a first temperature value associated with the processor.

In the serial communication system, the first temperature value is returned as a sixteen bit value having a most significant and a least significant byte, and wherein the most significant byte returned represents an integer portion of the first temperature value from 0° to 255° C. and wherein the upper three bits of the least significant byte returned represents a fractional portion of the first temperature value from 0° C. to 0.875° C. in increments equal to 0.125° C.

In an embodiment, the protocol on the serial communication system includes an initialization condition where the serial interface master drives at least 32 consecutive clock cycles of 1's on the data line to the serial interface slave, a start condition wherein the master serial interface signals a start condition by driving the data line low for one clock cycle of the clock signal line following the initialization condition, a command phase, a data phase. The last bit of the data phase for a read temperature command includes a valid bit, which is at a first value to indicate that the data is valid and at a second value to indicate that the slave serial interface is not ready.

In an embodiment the slave is further responsive to a read node ID command to return an identification associated with the processor. The serial interface slave is further responsive to a version command to return an identification of a version of the serial interface supported by the microprocessor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
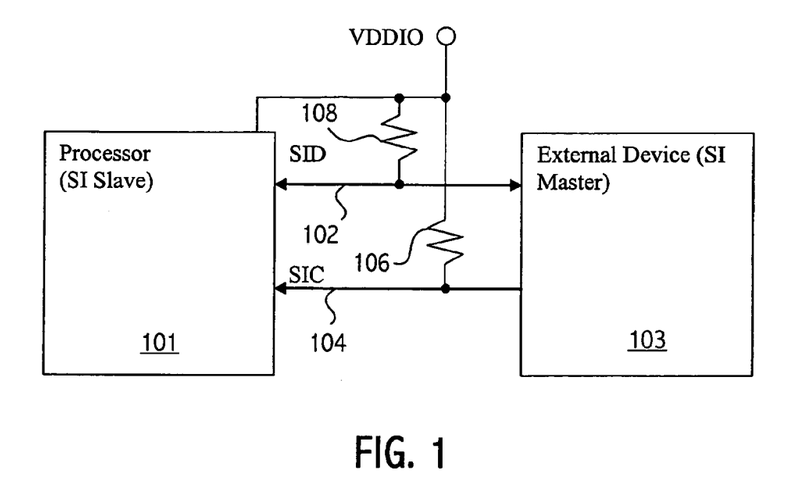
FIG. 1 shows a block diagram with the Serial Interface used to monitor processor temperature.

Referring now to FIG. 1, illustrated is an exemplary embodiment of a Serial Interface (SI). In one embodiment, the Serial Interface is a simple digital interface that provides access to the processor's temperature and Node ID. The Serial Interface can be used in place of externally accessible on-die thermal diode supported by previous processors, where the processor provides a temperature in a digital format. The serial interface includes a slave device 101, which in the illustrated embodiment is a processor and an external master device 103. The slave device 101 and master device 103 are coupled by a two wire point-to-point communication link that allows one master device and one slave device to communicate.

Figure 2:
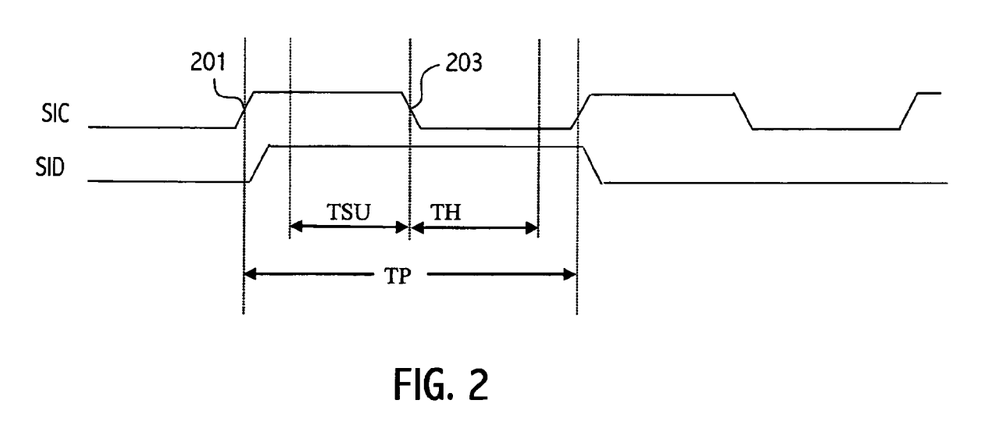
FIG. 2 shows a Serial Interface timing diagram.

The two wire communication link includes a Serial Interface Clock (SIC) signal 104. The SIC signal is an input to the processor 101 and is used to clock information into and out of the processor on the Serial Interface Data (SID) signal 102. Information is transmitted of the Serial Interface most significant bit (MSB) first. Referring to FIG. 2, information is shifted out on SID 102 based on the rising edge of SIC 201. SID is sampled as an input with the falling edge of SIC 203. In one embodiment, SIC and SID are pulled up on the motherboard to VDDIO through 300 ohm resistors 106 and 108. The SIC signal 104 may be an open drain output on the SI master 105. SID is bidirectional and implemented as an open drain output (or drive low for low, and high impedance for high). In the illustrated embodiment, VDDIO is the voltage plane that powers the processor memory interface and the processor Serial Interface slave circuitry. In an embodiment VDDIO is 1.8V nominal for DDR2. In other embodiments VDDIO may be 1.5V nominal or other voltages. The masters may be implemented to operate at multiple voltage levels.

Referring to FIG. 2 exemplary timing relationships are shown for SIC and SID. In one embodiment the SIC period TP is minimum 1000 nanoseconds (ns) and has no maximum. Thus, the frequency can range from 0 to 1000 KHz in such an embodiment. Various setup (TSU) and hold (TH) requirements and other electrical parameters may be specified according to the particular implementation. Note that internal logical hysteresis may be implemented to cover motherboard related signal integrity issues with SIC (rising or falling edges that are not clean).

Figure 3:
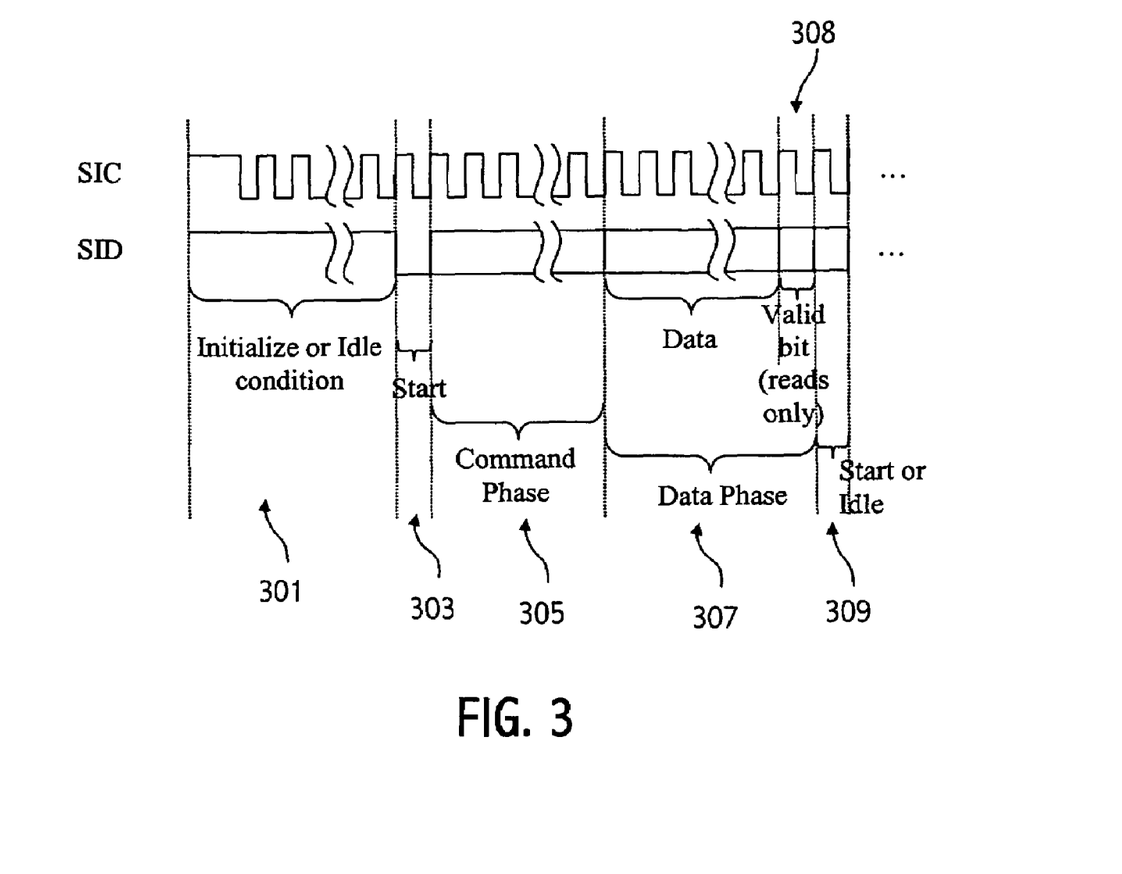
FIG. 3 shows Serial Interface protocol phases.

Referring to FIG. 3, the Serial Interface protocol includes an initialization condition 301, a start condition 303, a command phase 305, a data phase 307, and an idle condition 309. The master initializes the slave before signaling a start and issuing a command. In one embodiment, initialization is defined as the master driving at least 16 consecutive SIC cycles of 1's on SID to the slave. In other embodiments, the initialization period may be 32 consecutive SIC cycles of 1's or other appropriate number suitable to ensure the slave is initialized. During the initialization period, the Serial Interface is being initialized and is idle. The slave does not respond to the master until it has detected the initialization. Note that the slave may only look for a 16 clock initialization sequence once after its PWROK signal has asserted. But the master should consecutively shift out an additional 16 clocks for a total of 32 consecutive clocks while SID is high to ensure that the slave's state machine is flushed and is at an idles state. It is the master's responsibility to ensure that SID is sampled high for at least 32 SIC cycles before signaling a start and issuing a command. If the slave has not detected initialization or is not able to respond to a command, the slave signals that it is not ready by not asserting the valid bit (slave leaves SID high) after the data transfer during a read command. If the master detects a valid bit=1, then it re-initializes the Serial Interface by signaling the idle condition, e.g., for at least 32 SIC cycles before trying to access the slave again.

After initialization the master signals a start condition 303 by driving SID low for one SIC cycle following an initialization condition, an idle condition, or a data phase. The command phase 305 follows the start condition 303. A command is sent by the master immediately after it signals a start condition. In one embodiment, commands are 8-bits. Other command lengths are of course possible in other embodiments. Certain commands may imply data phases of various lengths, including no data phase.

The command phase 305 is followed by the data phase 307. The data phase 307 immediately follows the command phase 305. The command dictates the length of the data phase and whether the slave drives the data, the master drives the data, or if the master and slave take turns driving data.

The valid bit immediately follows the data from the slave during the data phase associated with a read. In the case of commands which force the slave to drive data (reads), the data phase includes data followed by one bit (the Valid bit) 308 indicating that the data is valid or the slave is not ready. There is no valid bit associated with writes. A valid bit of 0 indicates the data is valid. A valid bit of 1 indicates the slave is not ready to respond.

Immediately following the data phase, the master signals an idle condition as in 301 or a start condition as in 303. If another command is to be sent, the master signals the start condition 303 and then sends another command. After a data phase, if the master does not have another command to send, then it signals the idle condition (SID high). Idle conditions can persist for any number of SIC cycles and any amount of time. The master keeps SID high during the entire idle condition. SIC can be stopped in the high state by the master after signaling an idle condition for one clock. It is expected that SIC will be stopped in the high state if an idle condition is going to persist for some number of SIC cycles.

The Serial Interface provides specific commands that return a predefined type of data over the Serial Interface. Table 1 lists exemplary Serial Interface commands that are supported in an embodiment of the Serial Interface.

TABLE 1

| Command [7:0] | Attribute | Data Size | Description |
| --- | --- | --- | --- |
| 00h | Read | 8 bits | Read Serial Interface Version |
| 01h | Read | 16 bits | Read Processor Control Temperature (Tcontrol). |
| 02h | Read | 8 bits | Read Processor Node ID. |
| 03h to FFh | | | Reserved |

The command Read Serial Interface Version causes the slave to report the 8-bit Version of the Serial Interface that it supports. For example, a version number of "00" can be used to indicate that the supported serial interface commands are 00h through 02h. Another version number can be used to indicate that other commands are supported.

The Read Processor Control Temperature command or Tcontrol command causes the Serial Interface slave to return a representation of the processor temperature, which in one embodiment is a left justified fixed point number representation of the processor temperature. In one embodiment, the temperature is returned in a 16 bit binary representation (MSB:LSB) of the processor temperature in ° C. in which the most significant byte represents the integer portion of the temperature from 0° to 255° and the upper three bits (left justified) of the least significant byte represents the fractional portion of the temperature. One increment of the upper three bits of the LSB equals 0.125° C. For example, a control temperature of 25.125 is represented in the most significant byte as 0001 1001 and in the lower byte as 001xXXXX, where Xs are don't cares. Other embodiments may use only eight bits to return the temperature or use a different number of bytes and bits. In addition, the temperature range and representation may vary in different embodiments.

The control temperature value may be utilized to control various thermal aspects of the system. The control temperature returned by this command may be a measured internal temperature adjusted by one or more parameters so it may be used for thermal control in the system. An exemplary approach for determining an internal temperature in an integrated circuit such as a processor is described in the patent application entitled "Zoned Thermal Monitoring", application Ser. No. 11/110,379, filed Apr. 20, 2005, which application is incorporated herein by reference.

In some embodiments, one or more additional read temperature commands, in addition to the Tcontrol command, return other internal processor temperature(s), for example an internal temperature that is not adjusted by the one or more parameters used to generate the control temperature or is adjusted by different parameters. Other commands may also be utilized in embodiments of the invention.

The Read Processor Node ID command causes a processor identification to be returned by the slave. In one embodiment BIOS programs the processor identification into the processor. The processor identification is represented in one embodiment as a 3 bit Node ID programmed by BIOS, which is returned as the 3 LSBs in a Node ID byte in response to the Node ID command on the serial interface.

Various topologies are possible in systems that incorporate the Serial Interface. The various topologies include hardware monitors that directly incorporate support for Serial Interface, Serial Interface to SMBus translator integrated circuits (ICs), Serial Interface to SMBus translator ICs that incorporate other functionality, and embedded controllers or service processors that control the Serial Interface under firmware control. In addition, Serial Interface to Diode translations are also possible, where the digital temperature value is translated to be available in the form of a two pin diode interface that can be accessed by existing control circuits.

Figure 4:
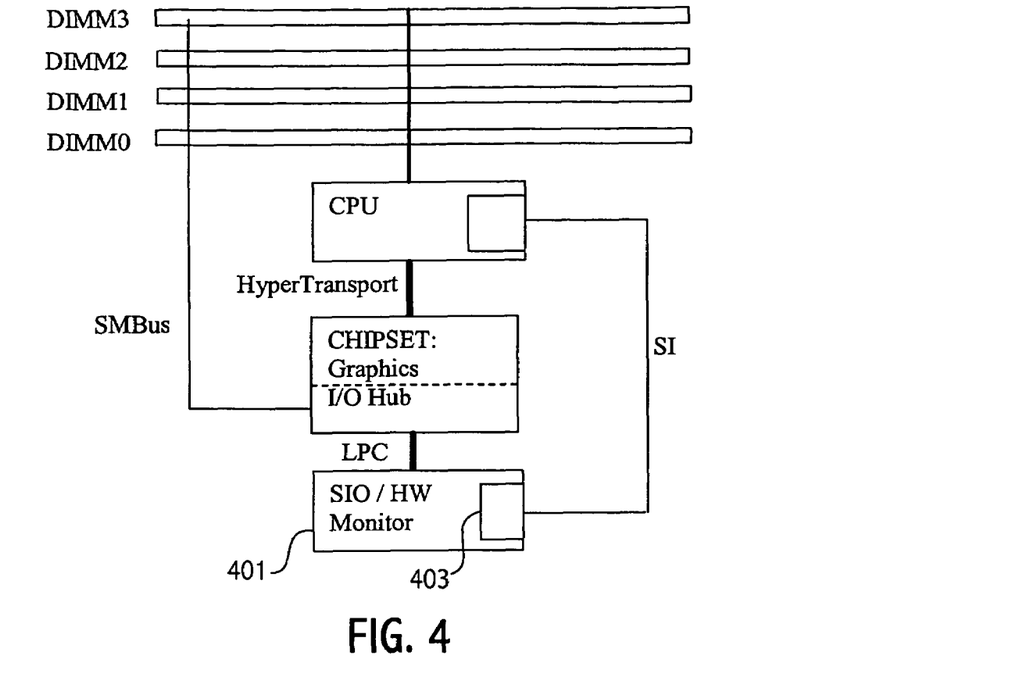
FIG. 4 shows a topology in which an SIO/Hardware monitor provides native support for the Serial Interface.

Referring to FIG. 4, in one cost effective embodiment, the Super I/O (SIO)/Hardware Monitor integrated circuit (IC) 401 provides native support for the Serial Interface in the form of a Serial Interface master 403. An exemplary SIO/Hardware Monitor IC 401 is an integrated circuit that provides support for legacy interfaces and devices, such as a floppy disk controller, an IEEE-1284 Parallel Port interface, 16C550-UART-based serial port interfaces, a game port, etc. In addition, the hardware monitor can provide thermal functions such as monitoring and controlling fans.

The embodiment illustrated in FIG. 4 may be utilized, e.g., for desktop systems. Providing native support provides an effective way for SIO/Hardware Monitor/Management IC 401 to monitor processor temperature because the Serial Interface does not have the analog issues associated with the on-die diode of previous processors. The SIO/Hardware Monitor 401 reads the temperature of the processor using the Tcontrol temperature command to determine what actions if any need to be taken relative to processor fan speed, or causing an SCI (system control interrupt) to invoke an Advanced Configuration Power Interface (ACPI) thermal zone action in response to a change in processor temperature.

Figure 5:
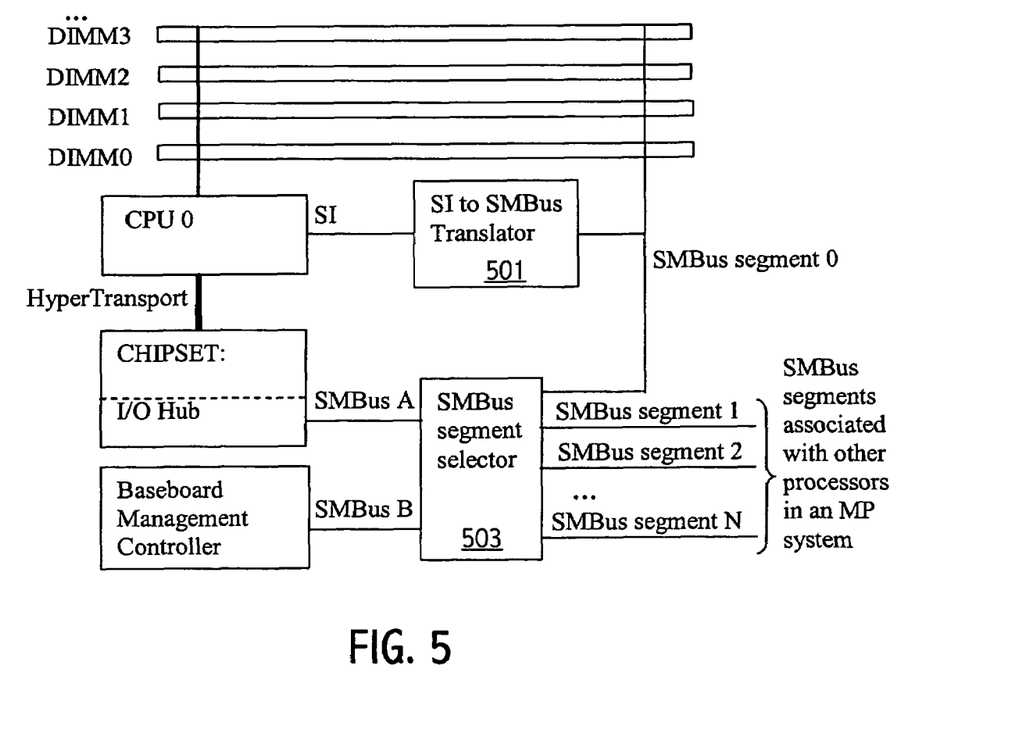
FIG. 5 shows an exemplary multiprocessor (MP) system with one Serial Interface to SMBus translator integrated circuit per processor.

In another topology illustrated in FIG. 5, a Serial Interface to SMBus translator integrated circuit 501 that replaces the SMBus temperature sensor reads the processor on-die diode. The SMBus is well known in the industry. An embodiment, such as shown in FIG. 5, may utilize the translator integrated circuit (IC) 501 as a slave on the SMBus link and the master on the Serial Interface link. Such a translator IC may be useful in a system where devices can interface to the SMBus but not the Serial Interface. Thus, the translator provides a translation between the protocols and functionality of the Serial Interface and the SMBus.

In multiprocessor systems a Serial Interface to SMBus translator integrated circuit is associated with each processor. Each processor in an MP system has an SMBus segment associated with it. Each SMBus segment has the Serial Presence Detect (SPD) EEPROMs for the dual in line memory modules (DIMMs) and the Serial Interface to SMBus translator associated with the processor. An SMBus segment selector (which could be an additional device or incorporated into existing devices) allows the chipset associated with the BSP (Bootstrap processor) to control the SMBus selector during power on self test (POST). This enables the BIOS to directly associate each processor with the memory physically connected to it, by reading the Node ID of the processor associated with each SMBus segment. After POST, the BIOS passes control of the SMBus segment selector to the BMC (baseboard management controller) so that the BMC can monitor the temperature of the processors in the system. FIG. 5 depicts an MP system in which each processor has a Serial Interface to SMBus translator IC 501 associated with it. Only CPU 0 of the MP system is shown. The SMBus segment selector 503 is also shown.

Figure 6:
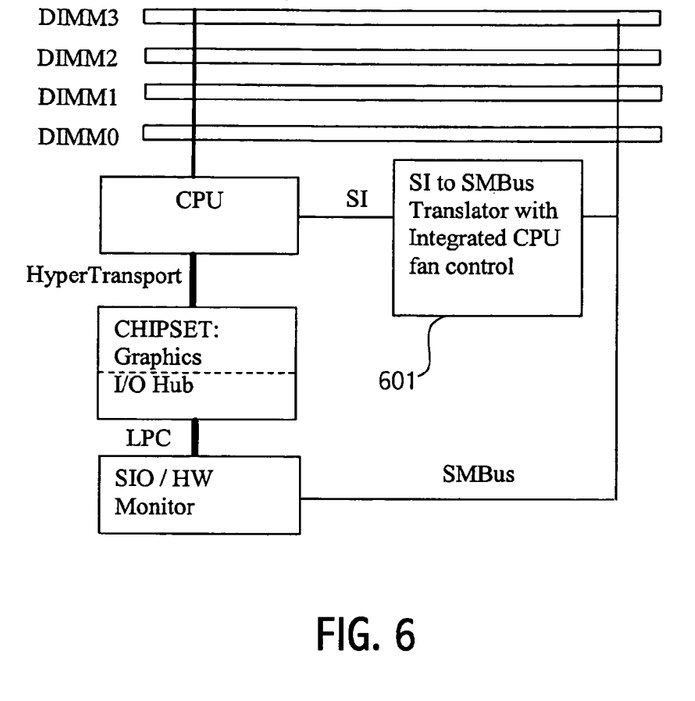
FIG. 6 shows an exemplary Serial Interface to SMBus translator with integrated CPU fan control.

In another embodiment, illustrated in FIG. 6, the Serial Interface to SMBus translator integrated circuit 601 includes additional functionality such as integrated processor fan control.

Figure 7:
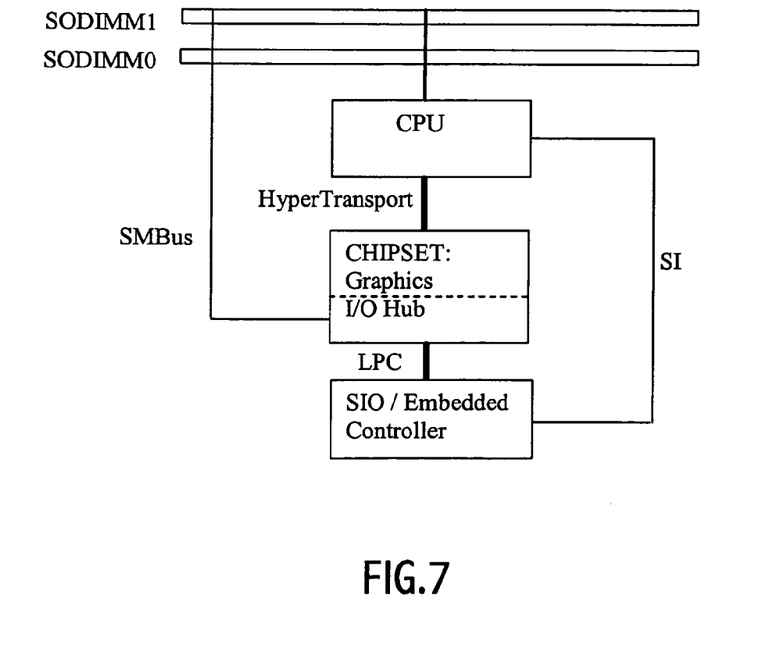
FIG. 7 shows an exemplary notebook implementation with Serial Interface accessed by an embedded controller.

Another embodiment using a Serial Interface is shown in FIG. 7. For notebook PCs and other systems with an embedded controller or service processor that supports General Purpose I/O (GPIO), such a controller/processor can be used under firmware/software control to access the Serial Interface for temperature and other Serial Interface information. FIG. 7 depicts this Serial Interface usage in a notebook PC.

Figure 8:
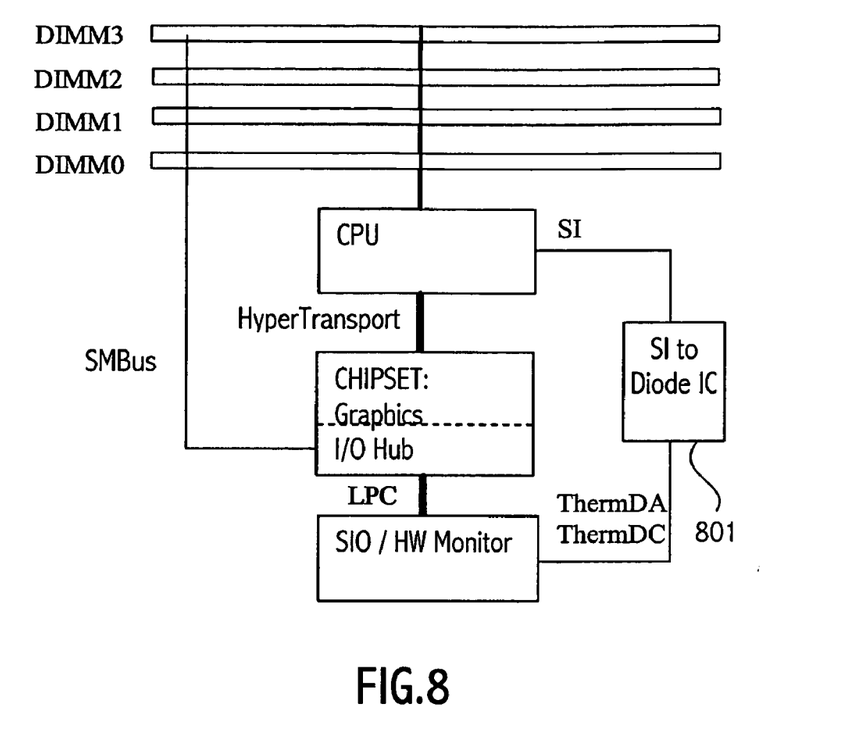
FIG. 8 shows a topology that utilizes a Serial Interface to diode translation implementation.
Figure 9:
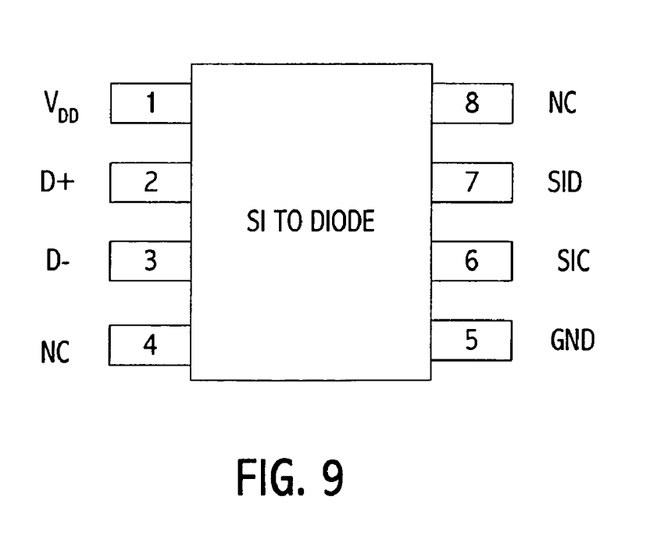
FIG. 9 shows an exemplary Serial Interface to diode integrated circuit pinout.

In another embodiment shown in FIG. 8, a Serial Interface to diode interface integrated circuit (IC) 801 is illustrated. The Serial Interface to diode interface integrated circuit 801 converts the digital temperature value read from the Serial Interface to a form that can be read over a conventional diode interface. That allows existing SIOs or other hardware monitoring devices that monitor a processor diode directly to monitor the temperature of processors that support the Serial Interface. In an embodiment, a Serial Interface to diode IC continuously polls the Serial Interface slave with the Read Processor Control Temperature command and makes the value available on the diode interface. FIG. 9 shows an exemplary Serial Interface to diode integrated circuit pinout. The diode values provided by the diode interface integrated circuit (IC) 801 provide analog values that behave similarly to thermal diodes found on x86 processors. The equation for temperature measurement from such a diode is below.

$$\Delta V_{D-+} = n\frac{KT}{q}\ln(N) = 86.94*10^{-6}*T*\ln(N)$$

Where:

K=Boltzmann's constant q=1.6×10$^{-19}$ Coulombs

T=control temperature provided by the Serial Interface

N=ratio of two currents supplied to diode n=ideality factor of the diode=1.008

Thus, various embodiments have been described relating to utilization of a serial interface. The description of the invention set forth herein is illustrative, and is not intended to limit the scope of the invention as set forth in the following claims. Other variations and modifications of the embodiments disclosed herein may be made based on the description set forth herein, without departing from the scope of the invention as set forth in the following claims.

What is claimed is:

1. A serial communication system comprising:
    an integrated circuit having a master serial interface; and
    a processor having a slave serial interface coupled to the master serial interface through a clock signal line and a data signal line wherein the slave serial interface is responsive to a read temperature command issued by the master serial interface to return a temperature value associated with the processor.

2. The serial communication system as recited in claim 1 wherein the temperature value is returned as a sixteen bit value having a most significant and a least significant byte, and wherein the most significant byte returned represents an integer portion of the temperature value from 0° to 255° C.

and wherein the upper three bits of the least significant byte returned represents a fractional portion of the temperature value from 0° C. to 0.875° C. in increments equal to 0.125° C.

3. The serial communication system as recited in claim 1 wherein the slave serial interface is responsive to at least one additional read temperature command to return at least one additional temperature value associated with the processor.

4. The serial communication system as recited in 3 wherein the temperature value includes one or more offsets to a measured temperature.

5. The serial communication system as recited in claim 1 wherein protocol on the serial communication system includes, an initialization condition where the master serial interface drives at least 32 consecutive clock cycles of 1's on the data line to the slave serial interface, a start condition wherein the master serial interface signals a start condition by driving the data line low for one clock cycle of the clock signal line following the initialization condition, a command phase, and a data phase.

6. The serial communication system as recited in claim 5 wherein a last bit of the data phase for a read temperature command includes a valid bit, the valid bit being at a first value to indicate that the data is valid and at a second value to indicate that the slave serial interface is not ready.

7. The serial communication system as recited in claim 1 wherein the slave serial interface is further responsive to a read node ID command to return an identification associated with the processor.

8. A method for communicating over a point to point serial communication system having a clock signal line and a data signal line coupling a serial interface master and a serial interface slave, the method comprising:
   sending a read temperature command to the serial interface slave from the serial interface master using the clock signal line and the data signal line; and
   in response to the read temperature command, the serial interface slave supplying over the data signal line a temperature value associated with a processor on an integrated circuit containing the serial interface slave.

9. The method as recited in claim 8 wherein the temperature value is returned as a fixed point number.

10. The method as recited in claim 8 further comprising the serial interface slave responding to another read temperature command from the serial interface master to return another temperature value associated with the processor.

11. The method as recited in claim 8 wherein protocol on the serial communication system includes an initialization condition where the serial interface master drives at least 32 consecutive clock cycles of 1's on the data line to the serial interface slave, a start condition wherein the serial interface master signals a start condition by driving the data line low for one clock cycle of the clock signal line following the initialization condition, a command phase, and a data phase.

12. The method as recited in claim 11 further comprising the serial interface slave sending as a last bit of the data phase for a read temperature command a valid bit, the valid bit being at a first value to indicate that the data is valid and at a second value to indicate that the serial interface slave is not ready.

13. The method as recited in claim 11 further comprising the serial interface slave responding to a read node ID command to return an identification associated with the processor over the data line.

14. A serial communication system comprising:
   a microprocessor having a slave serial interface for coupling to a master serial interface through a clock signal line output terminal and a data signal line output terminal wherein the slave serial interface is responsive to a read temperature command issued by the master serial interface to return to the master serial interface a temperature value associated with the microprocessor.

15. The serial communication system as recited in claim 14 further comprising an integrated circuit incorporating the master serial interface coupled to the clock signal line output terminal and a data signal line output terminal via a clock signal line and a data signal line coupled to the master serial interface.

16. The serial communication system as recited in claim 15 wherein the slave serial interface is responsive to another read temperature command, the other read temperature command having a different decode value than the read temperature command, to return another temperature value associated with the microprocessor.

17. The serial communication system as recited in claim 15 wherein protocol on the serial communication system includes an initialization condition where the master serial interface drives at least 32 consecutive clock cycles of 1's on the data line to the slave serial interface, a start condition wherein the master serial interface signals a start condition by driving the data line low for one clock cycle of the clock signal line following the initialization condition, a command phase, and a data phase.

18. The serial communication system as recited in claim 17 wherein a last bit of the data phase for the read temperature command includes a valid bit, the valid bit being at a first value to indicate that the data is valid and at a second value to indicate that the slave serial interface is not ready.

19. The serial communication system as recited in claim 15 wherein the slave serial interface is further responsive to a read node ID command to return an identification associated with the microprocessor.

20. The serial communication system as recited in claim 19 wherein the slave serial interface is further responsive to a version command to return an identification of a version of the serial communication system supported by the microprocessor.

* * * * *